United States Patent [19]
Gifford

[11] Patent Number: 5,457,349
[45] Date of Patent: Oct. 10, 1995

[54] RECIPROCATING ELECTROMAGNETIC ENGINE

[76] Inventor: Leland W. Gifford, 23240 88th Ave. S., Apt. CC102, Kent, Wash. 98031

[21] Appl. No.: 86,478

[22] Filed: Jun. 30, 1993

[51] Int. Cl.$^6$ .................................................. H02K 33/00
[52] U.S. Cl. ........................ 310/24; 310/34; 310/35
[58] Field of Search .................................. 310/15, 17, 23, 310/24, 34, 35

[56] References Cited

U.S. PATENT DOCUMENTS

| | | | |
|---|---|---|---|
| Re. 34,229 | 4/1993 | Shimizu et al. | 335/302 |
| 3,287,616 | 11/1966 | McNeil | 318/37 |
| 3,676,719 | 7/1972 | Peeci | 310/24 |
| 3,890,548 | 6/1975 | Gray | 318/139 |
| 4,187,440 | 2/1980 | Ulmer | 310/24 |
| 4,259,653 | 3/1981 | McGonigal | 335/230 |
| 4,317,058 | 2/1982 | Blalock | 310/24 |
| 4,359,673 | 11/1982 | Bross, Jr. et al. | 318/38 |
| 4,510,420 | 4/1985 | Sasso | 318/37 |
| 4,749,893 | 6/1988 | Reynolds | 310/24 |
| 4,870,306 | 9/1989 | Petersen | 310/12 |
| 5,047,700 | 9/1991 | Szakaly | 318/568.1 |
| 5,124,598 | 6/1992 | Kawamura | 310/30 |
| 5,146,395 | 9/1992 | McKie | 363/13 |

*Primary Examiner*—Thomas M. Dougherty
*Assistant Examiner*—Judson H. Jones
*Attorney, Agent, or Firm*—R. Reams Goodloe, Jr.

[57] ABSTRACT

A electromagnetically driven reciprocating engine. Reciprocating pistons are slidingly mounded in a cylinder and connected to a rotatable crankshaft. Fixed magnets, preferably of the samarium cobalt alloy type, are mounted in the piston to intermittently attract and repel sequentially energized electromagnets which are mounted in the cylinder walls. The electromagnets are mounted in radially oriented rows and strokewise outwardly extending layers adjacent the cylinder walls. The rows are radially disposed complimentary to the permanent magnets in the piston. The layers are disposed to provide a series of impulses both on the downstroke and on the upstroke, so as to urge the piston in the desired direction and thus turn the crankshaft to provide motive power. A power source for the electromagnets includes a capacitor discharge circuit for directing electrical energy to the electromagnets. A computerized control means regulates the timing of discharge of the capacitors and thus the timing of energizing the electromagnets. A staggered strokewise location for electromagnets which are actuating pistons operating in the same cycle is preferably provided so as to avoid the requirement for simultaneous energization of electromagnets in multiple cylinders; rather, only one layer of electromagnets at one strokewise position is simultaneously energized.

15 Claims, 6 Drawing Sheets

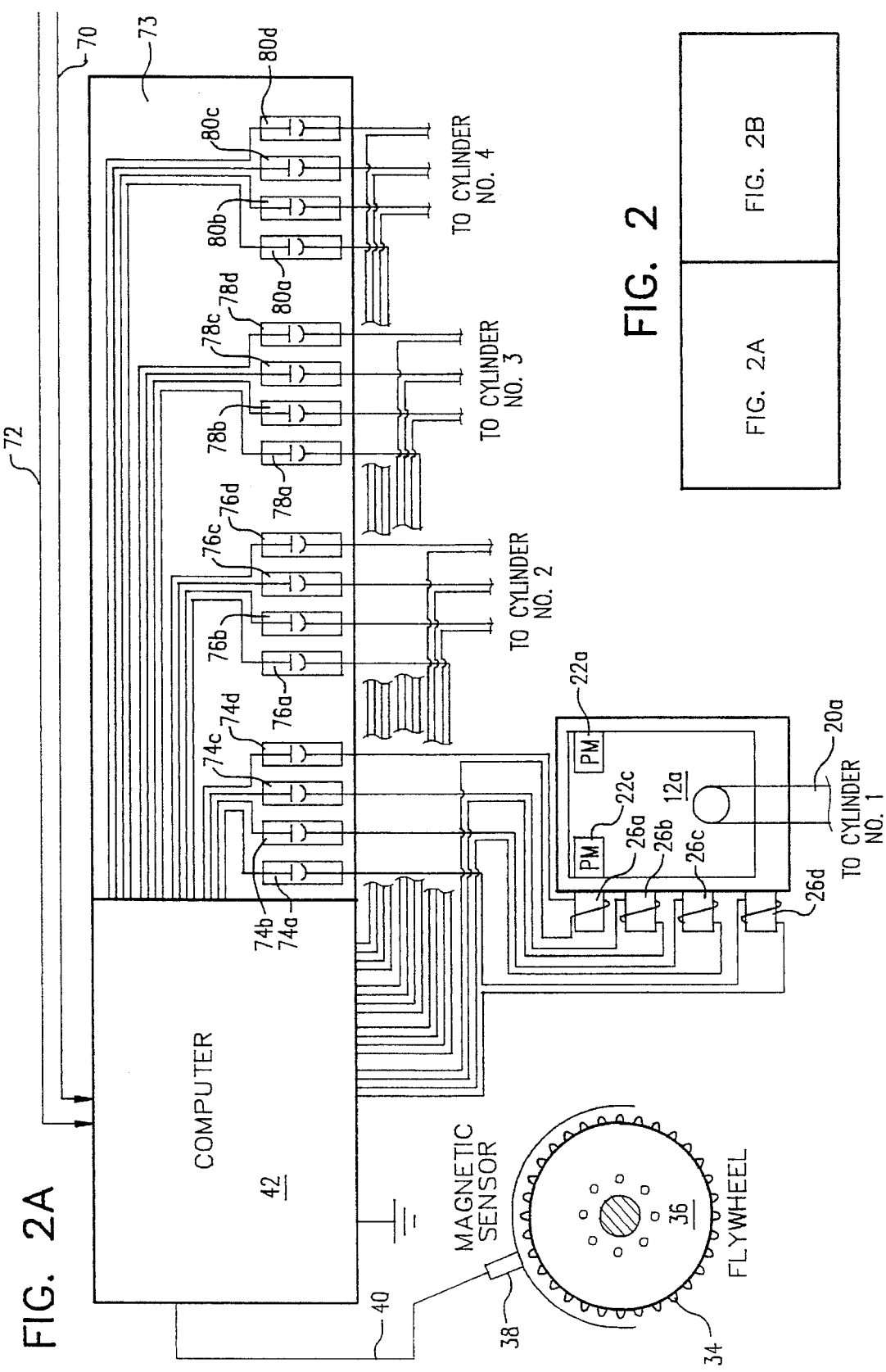

RECIPROCATING ELECTROMAGNETIC ENGINE

TECHNICAL FIELD OF THE INVENTION

This invention relates to a reciprocating electromagnetic engine. More specifically, disclosed and claimed herein is a magnetically driven engine for developing shaft power; a primary use of the invention is for powering electric automobiles.

BACKGROUND OF THE INVENTION

A wide variety of methods and apparatus are known for providing shaft power via electrical means. Most frequently, shaft power is provided via use of a conventional electric motor. However, in many uses, including for automotive use, there are certain advantages in providing a reciprocating engine with electric drive that is set up to work with a conventional output shaft, transmission and drive train. Quite simply, the sophisticated machinery currently employed for electrical drive automotive applications may be considerably more expensive than desirable.

From the foregoing, it is clear that there is a continuing need for a straightforward, easily manufactured electromagnetic reciprocating engine. Consequently, I have developed an engine which simplifies the control of the steps involved in turning electromotive force into shaft power.

THE PRIOR ART

Electromagnetic motors which may have some features resembling those disclosed herein to some remote extent include those disclosed in the following U.S. Pat. Nos.: 1,436,245, issued Nov. 21, 1922 to Geisler for ELECTRICAL ENGINE; 1,886,040 issued Nov. 1, 1932 to Moodyman for ELECTRIC MOTOR; 2,338,005 issued Dec. 28, 1943 to Morch for POWER PLANT; 3,676,719, issued Jul. 11, 1972 to Pecci for ELECTROMAGNETIC MOTOR WITH PLURAL RECIPROCATING MEMBERS; 4,187,440 issued Feb. 5, 1980 to Ulmer for ELECTROMAGNETIC ENGINE; 4,259,653 issued Mar. 31, 1981 to McGonigal for ELECTROMAGNETIC RECIPROCATING LINEAR ACTUATOR WITH PERMANENT MAGNET ARMATURE; 4,317,058 issued Feb. 23, 1982 to Blalock for ELECTROMAGNETIC RECIPROCATING ENGINE; 4,510,420 issued Apr. 9, 1985 to Sasso for SERVO ROTARY MOTOR; and 4,749,893 issued Jun. 7, 1988 to Reynolds for a MAGNETICALLY ACTUATED ENGINE.

Geisler utilizes a simple solenoid type actuating mechanism.

Moodyman also uses a solenoid type actuating mechanism, but includes a piston extension portion against which the solenoid acts.

Morch utilizes a magnetic piston and a cylinder wall having solenoid magnets wound thereabout, but utilizes a timing shaft and mechanical linkage to control engine operation.

Pecci shows a four cylinder electromagnetic engine with the core of each solenoid being eccentrically connected to a driving gear which meshes with a driven gear.

The devices disclosed in many of the above mentioned patents lack computer control technology to assure that the electromagnetic force is applied timely and in the desired sequence. Also, most prior art patents do not allow for programmable sequential application of electromagnetic force, as does the present invention, to smooth out the operation of the engine. Thus, a continuing need exists for simple, easily controlled electromagnetic engine with can provide a smooth operation with high efficiency.

SUMMARY OF THE INVENTION

I have developed a simple electromechanical engine for automotive or other use. A multicylinder electromagnetic engine is provided with a plurality of cylinders, each of which runs through the interior of an engine block and extends downward toward a generally forward to aft extending crankshaft means. Radially dispersed about the wall of each of the cylinders are multiple columns of electromagnets. A piston is disposed within each cylinder, and each piston is connected to the crankshaft means via a rod. Each piston includes permanent, samarium-cobalt type magnets rated at 40 gauss and preferably radially located 90 degrees apart at or near the top of each piston. The magnet locations are chosen to substantially radially align with the columns of electromagnets in the adjacent cylinder wall. An electrical power source is provided to power the electromagnets, and a control means, preferably a microprocessor computer, is provided to control the sequence of energizing the electromagnets, so that by energizing the electromagnets, the magnets on the pistons will be pushed down and pulled up in response to a timely applied electromagnetic field. The force imparted on the piston is transmitted by the rod to the crankshaft means, which provides power via an output shaft for desired uses.

OBJECTS, FEATURES, AND ADVANTAGES OF THE INVENTION

It is an object of the present invention to provide a magnetically actuated reciprocating engine.

It is also an object of the present invention to provide a magnetic engine which is easily adapted for replacement of existing gasoline powered automotive engines.

It is an important feature of the present invention that a control strategy is provided which assures the timely adjustment of power to the engine.

It is an important and primary feature of the present invention that it is easy and simple to operate.

Additional objects, advantages, and novel features of the invention will be set forth in the detailed description of the invention which follows, or may become apparent to the reader from the appended claims and accompanying drawings, or may be learned by practice of the invention. The objects and advantages of the invention may be realized and attained by means of the instrumentalities and combinations particularly pointed out in the appended claims, or by their equivalents.

BRIEF DESCRIPTION OF THE DRAWINGS

My invention may be more clearly understood by reference to the accompanying drawings thereof, wherein:

FIG. 2 illustrates how FIG. 2A and FIG. 2B join.

FIG. 2A is a system schematic which illustrates the interface between the capacitor bank, the piston electromagnets, and the position sensor at the flywheel.

DESCRIPTION

Figure 1:
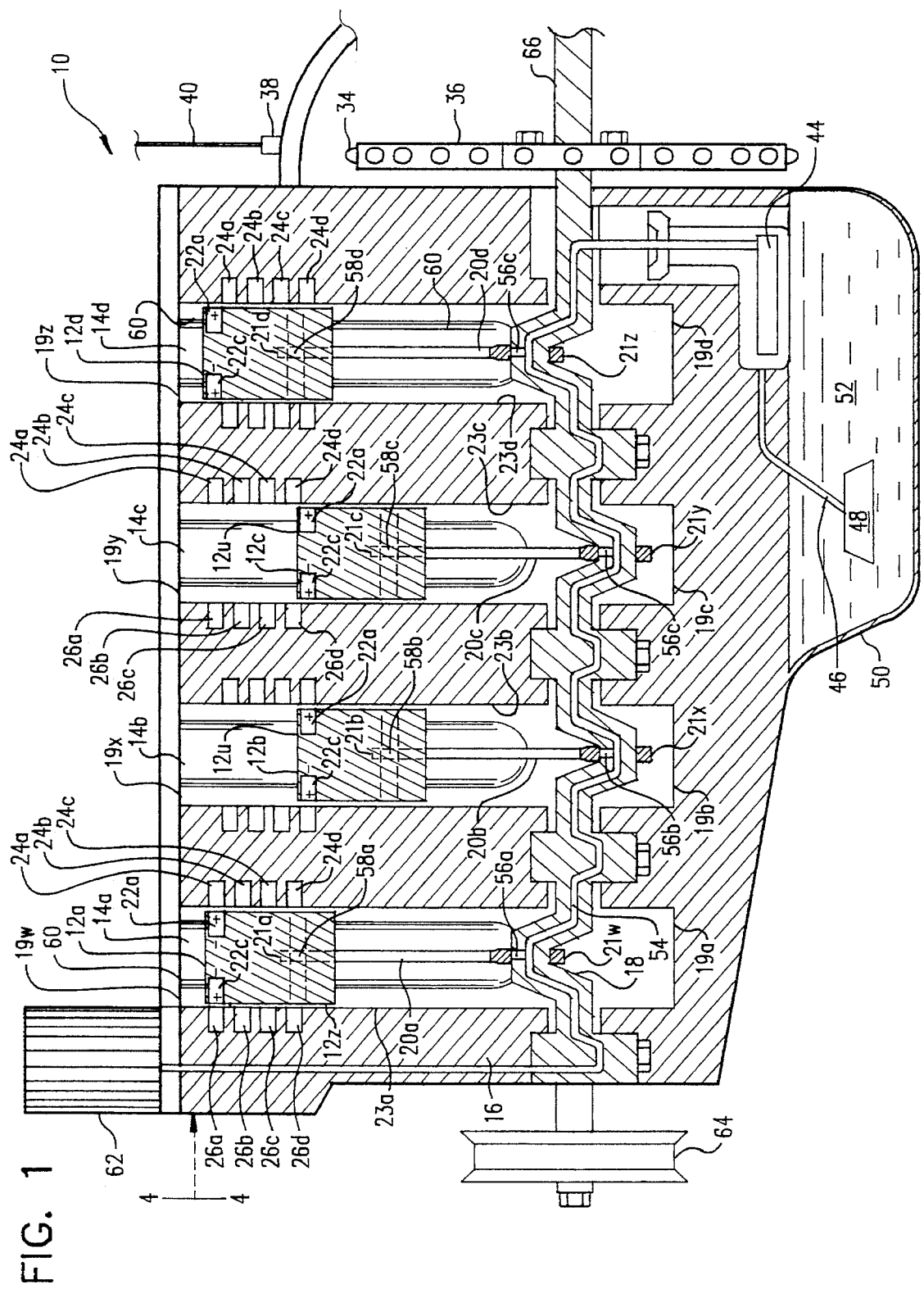
FIG. 1 is a vertical cross-sectional view of a four cylinder engine provided in accord with the present invention.

Referring first to FIG. 1, a vertical cross-sectional view of my electromagnetic engine 10 is provided. In the embodiment illustrated, for purposes of simplicity, pistons 12a, 12b, 12c, and 12d are disposed in tubular cylinders 14a, 14b, 14c, and 14d, which are bored in a preselected (preferably circular) cross-sectional shape through block 16. Block 16 may be manufactured in any non-magnetically intefering composition, such as non ferrous material like high strength plastic, ceramic, or aluminum. Alternately, the lower block could be cast iron as long as either aluminum or plastic cylinder walls are bolted to the cast iron lower block. Pistons 12a through 12d are reciprocally connected to rotatably mounted crankshaft 18 via way of rod means 20a, 20b, 20c and 20d, respectively. Each of the rod means has a piston end 21a, 21b, 21c, and 21d, respectively, at which the rod means is attached to pistons 12a, 12b, 12c, and 12d respectively, as further described herein below. Also, each of the rod means 20a, 20b, 20c, and 20d, respectively have a crank end 21w, 21x, 21y, and 21z, respectively, which attaches to crankshaft 18. With respect to rotatable crankshaft 18, cylinders 14a, 14b, 14c, and 14d may be strokewise described as having inner ends (closest to the crankshaft) 19a, 19b, 19c, and 19d, respectively, and outer ends (furthest from the crankshaft 18) 19w, 19x, 19y, and 19z, respectively.

Figure 4:
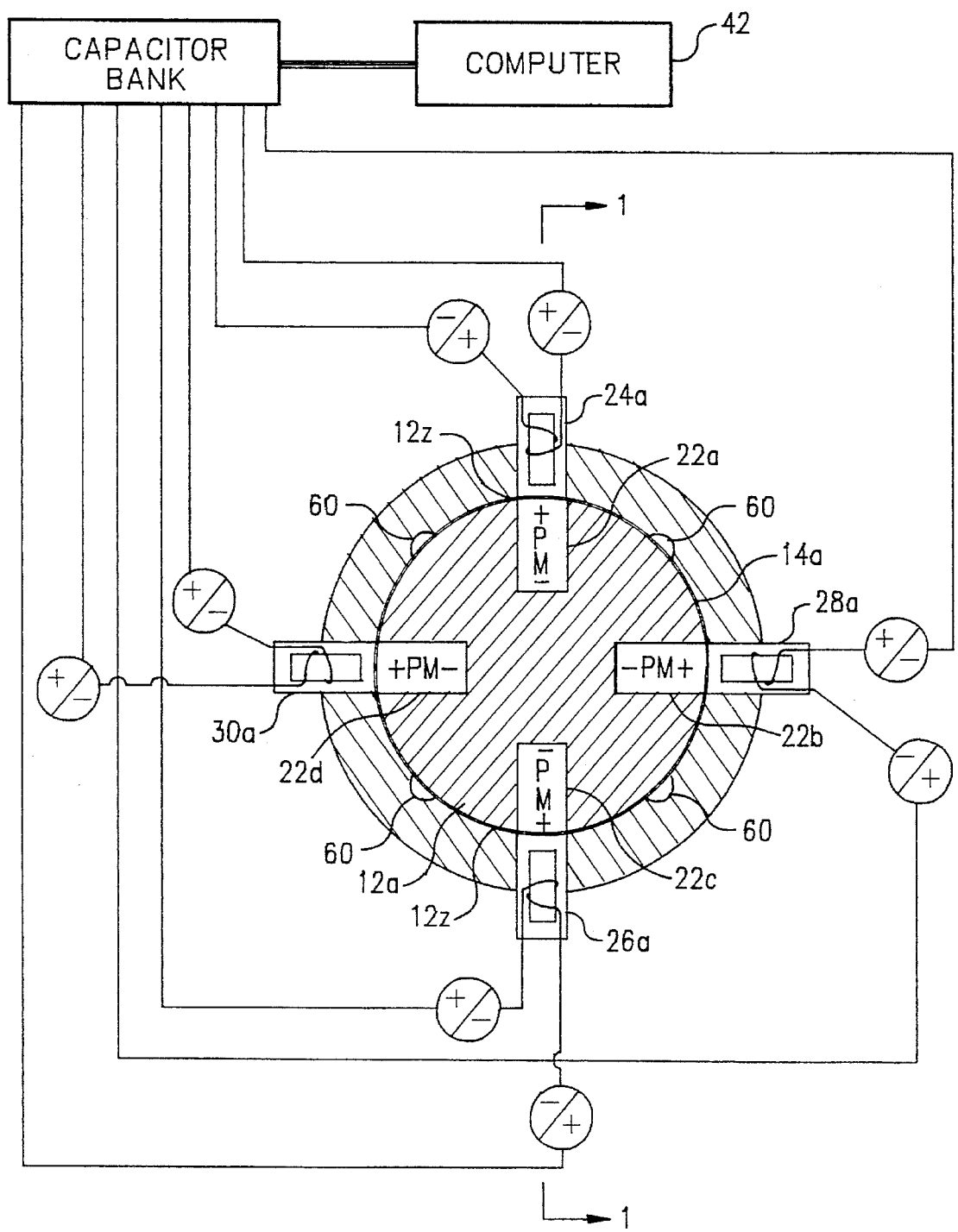
FIG. 4 is a horizontal cross-sectional illustration of the core of first cylinder of my engine, taken along the plane of arrow 4—4 of FIG. 1, which illustrates the construction of a cylinder and related electromagnets.

Each of pistons 12a through 12d includes an upper portion 12u having an outer radial edge 12z. Positioned at edges 12z are first ends of sets of high strength permanent magnets ("PM") 22a, 22b, 22c, and 22d, as also better understood from FIG. 4. The permanent magnets are ideally of samarium-cobalt alloy construction or of other high magnetic flux density composition. Preferably, field strength of 40 gauss is desirable in the permanent magnets. Referring now to FIGS. 1 and 4, it can be seen that the permanent magnets, preferably a set of four, namely magnets 22a, 22b, 22c and 22d, are situated in the upper portions 12u of the pistons 12a through 12d. Located adjacent to the walls 23a, 23b, 23c, and 23d of cylinders 14a through 14d are one or more, and preferably four, strokewise rows of electromagnets, as illustrated in FIG. 1. The first row or set of electromagnets are magnets 26a, 26b, 26c, and 26d, and the second row or set, visible in FIG. 1, are electromagnets 24a, 24b, 24c and 24d. As can be visualized form FIG. 4, a third row includes magnets extending strokewise inward from electromagnet 28a(and would include electromagnets 28b, 28c, and 28d, not shown); a fourth row includes magnets extending strokewise inward from electromagnet 30a(and would include electromagnets 30b, 30c, and 30d, not shown). Preferably, the first electromagnet in each row is arranged at the same strokewise (preferably vertical) position. A set of four electromagnets at a common strokewise height form a "layer" of electromagnets. Each layer is preferably simultaneously energized. For example, the first layer of electromagnets surrounding piston 12a, as is clear from FIG. 4, are electromagnets 24a, 26a, 28a, and 30a.

This first layer is preferably energized simultaneously. Then, the next layer, consisting of electromagnets 24b, 26b, 28b, and 30b would be simultaneously energized.

Each strokewise row of electromagnets consists of N electromagnets, and each row ideally contains two or more electromagnets, and preferably four electromagnets. The rows are radially arranged and juxtaposed to interact with the permanent magnets 22a et seq. just noted. Thus, the electromagnets are conveniently arranged strokewise along the walls 23a et seq. of the cylinders 14a thru 14d, and in layers as described above.

The engine 10 is operated by energizing the various layers of electromagnets in a timed sequence to preferably repel the high strength permanent magnet sets, 22a et seq., so as to urge the pistons 12a–12d to react against rods 20a–20d, and move inward, thus turning crank 18. In another embodiment, the electromagnets, either by layers as just described, or individually as appropriate, can be set up to both repel and to attract the high strength permanent sets 22a et seq., by reversing polarity on the electromagnets by way of switching circuit 86. The rows of electromagnets can also be set up to be used to keep the pistons centered within the cylinders, a feature that reduces friction and attendant loss of efficiency.

In the configuration illustrated, the engine 10 is operated as a two cycle engine, with the downward stroke achieved by repelling permanent magnets 22a et seq. with electromagnet layers as described above. Alternately, the upward stroke may be achieved by attracting the permanent magnets 22a et seq. with the electromagnets layers as described above, all in order. This mode of operation, easily achieved with the computerized control system as described hereinbelow, is an efficiency increasing feature of my engine 10 design. Other attraction/repulsion schemes are possible within the general teachings of the invention set forth herein, including use of both attraction and repulsion of the permanent magnets during a single upward or downward stroke. However, the two simple cycle schemes just described sufficiently illustrates the basic concept of engine operation.

In the combined attraction-repulsion operational cycle, the sets of electromagnets 24a et seq., 26a et seq., etc., are sequentially energized for attraction and repulsion of the permanent magnets 22a et seq., as appropriate. For example, in the "Number 3" piston 12c, the lower electromagnet 24d at first pulls piston 12c upward by attraction of magnet 22a. As the magnet 22a in piston 12c has passes the strokewise location of the electromagnet 24d along the cylinder wall 14c, electromagnet 24d is switched off, and then switched back on with reversed polarity, so as to repel the permanent magnet 22a and push it outward, which as shown, is upward. Likewise, the next innermost electromagnet 24c at first attracts, and then repels permanent magnet 22a as the strokewise position of piston 12 changes during the upstroke. This sequence is repeated by the next electromagnet 24b. At the outermost electromagnet 24a, the repulsion portion of the sequence begins the downstroke of the piston 12c.

To achieve the desired effect, the actual position of the pistons 12a et seq., and thus the location of the permanent magnets 22a et seq. must be identified by timing or sensing means 34 such as magnetic position indicators or other convenient means, which, depending upon the type of system chosen may be located on flywheel 36. Alternate position sensing means (such as phototransistor type sensors as provided by Ford Motor Company for Non-NAAO engine systems) may be used as desirable. In the embodiment shown, the location of position indicators 34 is identified by detector or sensors 38 (which are magnetic if indicators 34 are magnetic) as further seen in FIG. 2A, and sent via communication means 40 such as instrument wiring to a central computer means 42. The central computer means 42 is further described with reference to FIG. 5 below.

Before turning to further electrical details, the remaining mechanical details shown in FIG. 1 will be addressed. It will normally be advantageous to provide a basic oiling system for the engine 10. A gear type oil pump 44 having connected thereto an oil pickup line 46 with to screen 48, is located in sump 50, in order to remove oil 52 therein. The crankshaft 18 is oiled via way of interconnected longitudinal oil passage apertures 54 and side passageways 56a, 56b, 56c, 56d to the bearing surfaces of rods 20a et seq.; wrist pins 58a, 58b, 58c, and 58d are also oiled by splash from this pressurized system and by splash from cylinder walls. However, in my engine 10, there is normally no need for rings to scrape the oil 52 off of walls 23a et seq. of cylinders 14a et seq., so the oil 52 that makes its way upward past the pistons 12a et seq. is allowed to fall downward through oil passageways 60 in cylinder walls 23a et seq. to return to sump 50. An advantage of my oiling system is that the return of oil 52 down the outside of the cylinder walls 23a et seq. in oil passageways 60 is that the electromagnets 24a et seq. are easily cooled thereby. Additionally, an oil temperature modification device 62 is optionally provided to maintain an acceptable oil 52 temperature. Normally the device 62 will be used in the cooling mode, but heating may be optionally provided for extreme winter operations. Additionally, pulley 64 is provided to drive by conventional belt means (not shown) the selected accessories which may include a power steering pump and/or an alternator. At the rear of engine 10, shaft 66, affixed to and extending from crank 18, is provided to transmit rotational energy provided from engine 10 to desired uses, such as a motor vehicle transmission system.

Attention is now directed to FIG. 2A, where the computer controlled electrical system for energizing the various electromagnets is illustrated. An acceleration signal is provided via input communication means such as line 70 to computer means 42. Electrical power to drive the pistons 12a–n is provided to computer means via line 72. The computer means 42 includes means to determine the ramp speed of the charge of capacitors in capacitor bank 73, including the first set of capacitors 74 (74a, 74b, 74c, 74d), as well as subsequent sets 76 (76a–76d), 78 (78a–78d), and 80 (80a through 80d), in response to the acceleration signal received via line 70.

Figure 5:
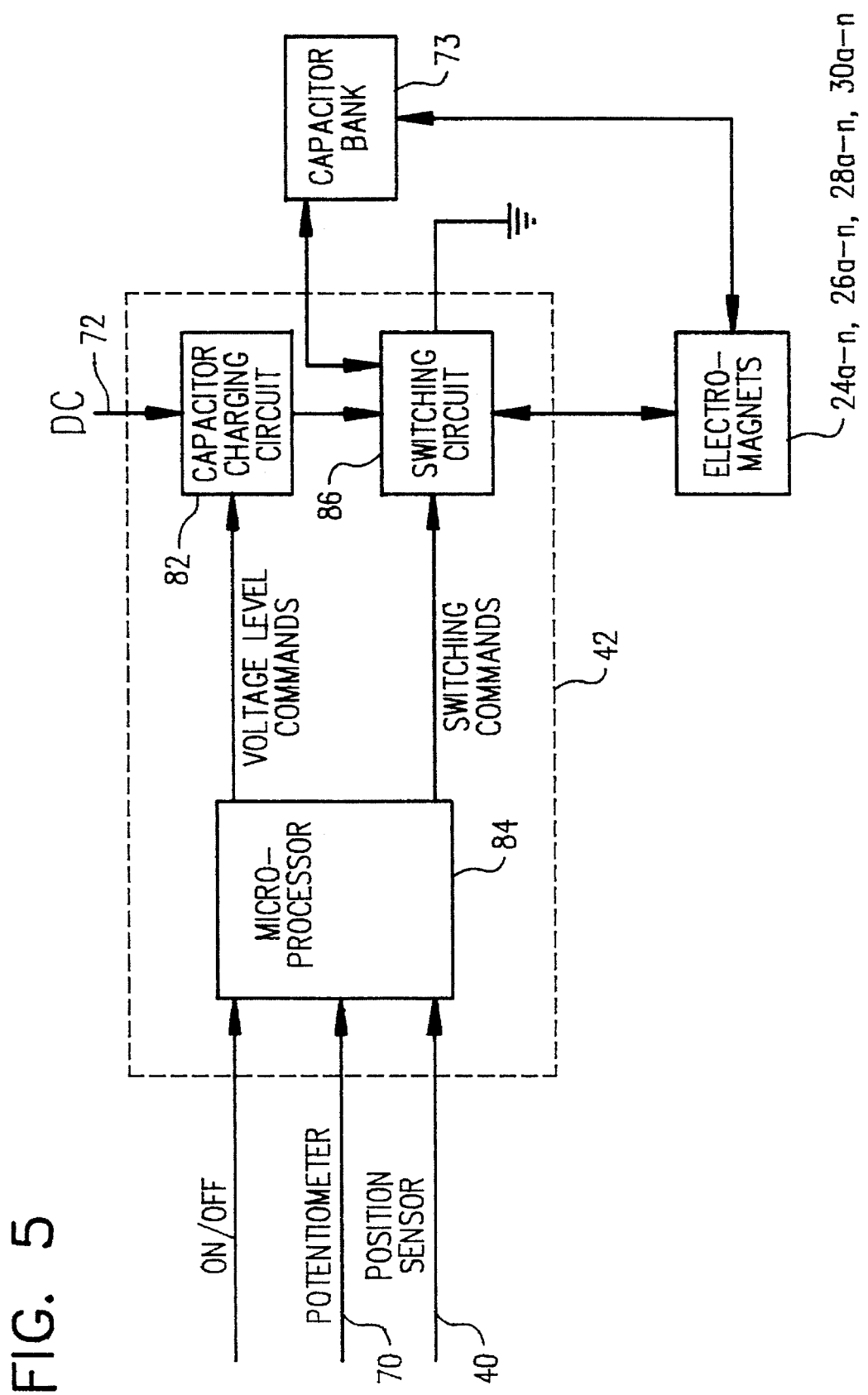
FIG. 5 is a schematic of the operational relationship between key components of the computer, and showing their operation with the capacitor bank and the electromagnets.

Referring now to FIG. 5, further details of computer means 42 are set forth. The electrical power input 72 is sent to a capacitor charging circut regulating means 82 which regulates the desired output voltage for operation of capacitor bank 73, in order to provide the required energy input level to the electromagnets along the cylinder walls to achieve a desired engine power rating. A microprocessor 84 is provided to (1) compute and output the desired voltage commands to the charging circuit regulating means 82, and (2) to provide timing means for controlling the sequence of switching commands sent to a switching circuit 86. The switching means 86 is configured to individually select desired electromagnets for energization, and to switch electrical power, with the desired polarity to the selected electromagnets in a preselected sequence. This is an important feature of my invention since the the actual operational characteristics can be modified by changing the preselected sequence to be executed by microprocessor 84. The microprocessor 84, which may be of any suitable type as may be selected by those knowledgeable in the art to which this specification is directed. Where possible, depending upon the peripheral functions desired and the selected capacitor control requirements, the use of a Ford Motor Company type "ECIV" control computer may be desirable.

Figure 2B:
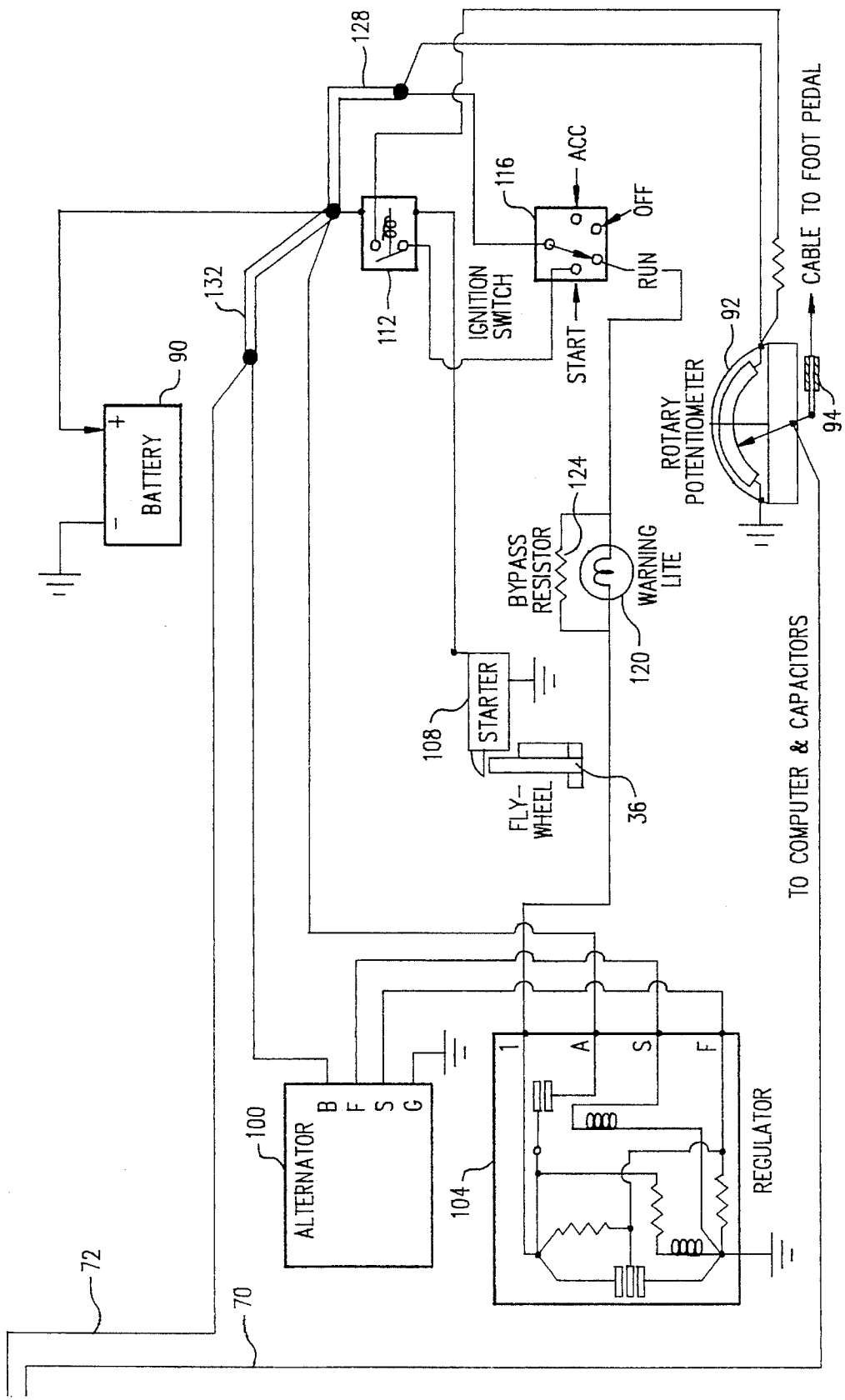
FIG. 2B is a schematic of the main battery, control switches, and ancillary electrical system components.

Turning now to FIG. 2B, the basic electrical system components are illustrated. A battery unit 90 provides a source of direct current electrical energy. The required speed and acceleration input to computer means 42 is provided by a variometer means 92 such as a rotary potentiometer or other suitable means of modulation of a signal input to computer means 42. In the case of use of my engine 10 with a conventional motor vehicle, the potentiometer 92 may be linked via cable 94 to a foot pedal of the usual configuration. In response to varying downward positioning of a conventional automotive foot pedal, the signal supplied via line 70 to computer means 42 provides input of the desired speed or acceleration, and in response thereto, the computer adjusts the charging rate of the various capacitor discharge banks 73 et seq. and switches power to the proper electromagnets, to provide the desired engine 10 speed. The computer means 42 control strategy is to provide preselected and reprogrammable calibrated data values to make decisions concerning the actuation of the discharge capacitor banks at different speeds and acceleration and deceleration rates. Essentially, the control strategy is a permanently stored software program embedded into microprocessor 84 of computer means 42 to control operation of engine 10. This firmware includes all of the equations and decision making logic needed to control operation of the engine 10. Through the use of the input signal 70 and operating strategies, the computer calls upon calibrated data values of the permanently stored software or equivalent memory chip of the microprocessor to make decisions concerning the actuation of the engine 10.

The remainder of the electrical system may be provided with conventional automotive circuit components, including an alternator 100, voltage regulator 104, starter 108, starter relay 112, ignition switch 116, and ignition warning light 120 with integral bypass resistor 124. The alternator 100 and voltage regulator 104 could be used to help recharge the battery during coasting or downhill operation. The starter 108 can be used to ensure proper direction of rotation in the preferred "two cycle engine" mode of operation. Also, it is advisable to include fuse links 128 and 132 for circuit overload protection.

Figure 3:
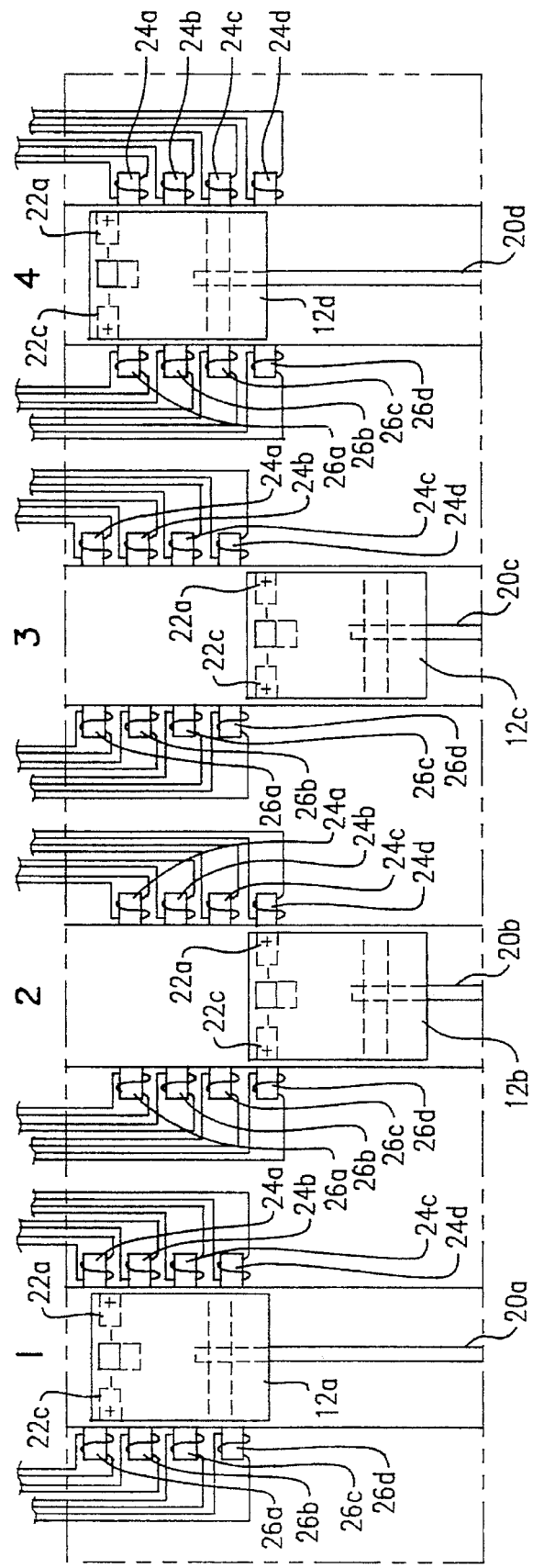
FIG. 3 is a partial schematic which illustrates the position of various cylinders during operation of the engine.

Attention is now directed to FIG. 3, where one system for spacing and sequencing the engine 10 is provided. The magnets 24a and 26a (as well as 24b and 24d not visible in this view but as noted in FIG. 4 below) can be located a slight distance such as about ¼ inch from the top of the number 1 cylinder 14a and of the number 3 cylinder 14c; more specifically, it is important to locate magnets 24a et seq. slightly above the uppermost position of the permanent magnets 22a through 22d when the pistons 12a and 12d are at their maximum outwardly extended position. The top magnets 24a and 26a(as well as 28a and 30a not visible in this view but as noted in FIG. 4 below) in the number 2 cylinder 14b and the number 4 cylinder 14d can be located a slight further inward distance, such as about ½ inch from the outside. The purpose of this offset and staggered position is to allow the computer to energize the top electromagnets of the number 1 cylinder 14a(magnets 24a, 26a, 28a, and 30a) to thus push against the permanent magnets 22a et seq. to push the piston down, rather than having a top dead center point where there is no immediate direction of force against the pistons 12a and 12d when the electromagnets 24a, 26a, 28a, and 30a are energized.

As can be appreciated from this FIG. 3, as set forth herein, one convenient method (but not the only method) for setting up the operation of engine 10 is to have the number 1 and 4 cylinders operate sequentially, and then to have the number 2 and 3 cylinders operate sequentially, so as to stagger the required electrical output requirements. This stagger or offset can also be appreciated from FIG. 1, where it is seen that the outward position of electromagnets 24a et seq. in the number 4 cylinder 14d is interspaced between the outward position of electromagnets 24a et seq. in number 1 cylinder 14a. The same effect can be noted between electromagnets 24a et seq in the number 2 cylinder 14b and the number 3 cylinder 14c.

Attention is now directed to FIG. 4 where a top view is provided of the layout of a piston 12a with permanent magnets 22a, 22b, 22c, and 22d. Surrounding the piston 12a is cylinder 14a. Disposed in cylinder 14a walls are shown the outermost row of electromagnets 24a, 26a, 28a, and 30a. As noted, the polarity of the electromagnets may change to either repel or attract the permanent magnets 22a, 22b, 22c, and 22d. Also, it will be obvious to those knowledgeable in the art that the polarity of the permanent magnets 22a, 22b, 22d, and 22d may be reversed, (with negative poles toward the cylinder walls) and the same effect may be achieved. In fact, with our commuter control system, any known polarity may be used (including mixed polarity systems); however, we have found it convenient to maintain the consistent approach set forth in the drawings provided to avoid confusion.

Therefore, it will be understood that the foregoing description of representative embodiments of the invention have been presented only for purposes of illustration and description and for providing an understanding of the invention. It is not intended to be exhaustive or to limit the invention to the precise forms disclosed. On the contrary, the intention is to cover all modifications, equivalents, and alternatives falling within the spirit and scope of the invention as expressed in the appended claims. It is therefore intended that the scope of the invention be defined by the appended claims rather than by the foregoing description; all changes which come within the meaning and range of equivalency of the claims are therefore intended to be embraced therein. And, of course, while the invention has herein been described and illustrated in connection with an exemplary electromagnetic engine apparatus and method for operating the same, the apparatus need not be employed in automotive applications, but can also be used in a variety of applications requiring shaft power.

I claim:

1. An electromagnetic actuated reciprocating engine, said engine comprising:
   (a) a block, said block including
      (1) a crankcase
      (2) a crank rotatably mounted within said crankcase,
      (3) at least one tubular cylinder, said cylinder having a bore of preselected cross- section, an inward end and an outward end, and a sidewall,
      (4) a reciprocating piston disposed within said cylinder, said piston including an upper portion having an outer radial edge, further comprising at least one permanent magnet having a first end mounted adjacent said outer radial edge,
      (5) rod means, said rod means including a crank end and a piston end, said rod means connecting with said crank at said crank end and with said piston at said piston end, said rod means adapted to move with said piston inward and outward in a strokewise fashion as said crank rotates, and to thereby transfer force from said piston to said crank, and from said crank to said piston,
   (b) a first row of electromagnets, said row comprising at least N electromagnets disposed strokewise and externally along a portion of said sidewall of said cylinder, said first row of said electromagnets substantially radially aligned along a single radial axis with said first end of said at least one permanent magnet in said piston, and where N is greater than or equal to two (2),
   (c) a power source for energizing said electromagnets,
   (d) an electrical switching circuit to direct electrical energy from said power source to the first electromagnet in said row, to the Nth electromagnet in said row, and each electromagnet therebetween,
   (e) computer means, said means including a selection and timing means to select direct which and when preselected electromagnets from the first to the Nth electromagnets are energized in a temporal fashion, so as to create an orchestrated sequence of timed and magnetic forces for urging said piston inward or outward.

2. The apparatus of claim 1, wherein said block comprises at least two cylinders.

3. The apparatus of claim 1, further comprising at least two permanent magnets in said piston, and further comprising at least two strokewise rows of electromagnets radially juxtaposed in a substantially radially aligned relationship to said permanent magnets.

4. An electromagnetic actuated reciprocating engine, said engine comprising:
   (a) a block, said block including
      (1) a crankcase
      (2) a crank rotatably mounted within said crankcase,
      (3) four or more tubular cylinders, said cylinders having a bore of preselected cross section, and an inward end, an outward end, and sidewalls,
      (4) a reciprocating piston disposed within each of said cylinders, said pistons including an upper portion having an outer radial edge, said pistons further comprising at least four permanent magnets, said magnets having two opposing magnetic force poles, and wherein one of said poles is mounted adjacent said outer radial edge,
      (5) a rod means for each of said pistons for interconnecting therewith, each of said rod means including a crank end and a piston end, said each of said rod means connecting with said crank at said crank end and with one of said pistons at said piston end, each of said rod means adapted to move with said interconnected piston inward and outward in a strokewise fashion as said crank rotates, and to thereby transfer force from said pistons to said crank, and from said crank to said pistons,
   (b) at least four rows of electromagnets in each of said cylinders, said rows each comprising a preselected number n of electromagnets, and wherein n is at least four, said rows disposed strokewise along said sidewall of said cylinders, said rows of said electromagnets substantially radially aligned with said permanent magnets in said pistons in said cylinders,
   (c) a power source for energizing said electromagnets,
   (d) an electrical switching circuit to direct electrical energy from said power source to said first electromagnet in said row, and to said second electromagnet in said row, and to said third electromagnet in said row, and to said nth electromagnet in said row, (e) computer means, said means including a selection and timing means to direct which and when preselected first, second, third and nth electromagnets are energized in a temporal fashion, so as to create an orchestrated sequence of timed magnetic forces for urging said pistons inward or outward.

5. The apparatus of claim 1 or claim 4, wherein said power source further comprises regulating means, said regulating means further comprising a capacitor bank, said bank comprising a plurality of capacitors.

6. The apparatus of claim 5, wherein said regulating means further comprises switching means, said switching means selectively connecting said capacitors in said bank to said power source to allow the charge and discharge of said capacitors in a preselected order and rate.

7. The apparatus of claim 1 or claim 4, wherein said electromagnets are energized in a two-stroke engine type sequence.

8. The apparatus of claim 1 or claim 4, wherein said permanent magnets comprise a samarian-cobalt alloy.

9. The apparatus of claim 8, wherein said magnets are of approximately 40 gauss field strength.

10. The apparatus of claim 1 or claim 4, wherein lubricating oil is utilized to minimize friction in said engine, and wherein said cylinders further include at least one strokewise extending passageway in said sidewalls, said passageway adapted to provide a fluid communication passage between the outward end and the inward end of said cylinder, so as to enable said lubricating oil to return to the inward end of said cylinder.

11. The apparatus of claim 4, wherein said electromagnets are sequentially energized to urge said pistons toward a centered relationship with respect to said cylinders, so as to minimize friction with said cylinder walls.

12. An electromagnetic actuated reciprocating engine, said engine comprising:

(a) a block, said block including
  (1) a crankcase
  (2) a crank rotatably mounted within said crankcase,
  (3) at least one cylinder, said cylinder having a preselected cross-section, an inward end and an outward end, and a sidewall,
  (4) a reciprocating piston disposed within said cylinder, said piston including an upper portion having an outer edge, wherein said outer edge further comprises three or more permanent magnets, and wherein each of said three or more permanent magnets has a first end mounted adjacent said outer edge,
  (5) rod means, said rod means including a crank end and a piston end, said rod means connecting with said crank at said crank end and with said piston at said piston end, said rod means adapted to move with said piston inward and outward in a strokewise fashion as said crank rotates, and to thereby transfer force from said piston to said crank, and from said crank to said piston, (b) three or more rows of electromagnets, each of said rows comprising at least N electromagnets disposed externally and strokewise along a portion of said sidewall of said cylinder, each of said three or more rows of said electromagnets being substantially aligned along a single axis with a first end of a preselected one of said three or more permanent magnets in said piston, and where N is greater than or equal to two (2), (c) a power source for energizing said electromagnets, (d) an electrical switching circuit to direct electrical energy from said power source to the first electromagnet in said row, to the Nth electromagnet in said row, and each electromagnet therebetween, (e) computer means, said means including a selection and timing means to select direct which and when preselected electromagnets from the first to the Nth electromagnets are energized in a temporal fashion, so as to create an orchestrated sequence of timed and magnetic forces for urging said piston inward or outward.

13. The apparatus of claim 12, wherein said block comprises at least two cylinders.

14. The apparatus of claim 12, wherein said electromagnets are sequentially energized to urge said pistons toward a centered relationship with respect to said cylinders, so as to minimize friction with said cylinder walls.

15. The apparatus as set forth in claim 12, wherein four permanent magnets and four rows of electromagnets are each provided.

* * * * *